(12) United States Patent
Karlsson (10) Patent No.: US 6,781,998 B1
(45) Date of Patent: Aug. 24, 2004

(54) RANDOM REORDERING SYSTEM/METHOD FOR USE IN ATM SWITCHING APPARATUS

(75) Inventor: Tobias Karlsson, Norsborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/545,187

(22) Filed: Apr. 7, 2000

(51) Int. Cl.[7] .............................................. H04L 12/28
(52) U.S. Cl. ............... 370/395.71; 370/394; 370/395.1; 370/395.7
(58) Field of Search ................................ 370/412, 413, 370/414, 415, 416, 395.1, 395.42, 395.43, 395.41, 395.4, 428, 429, 229, 394, 395.71

(56) References Cited

U.S. PATENT DOCUMENTS

| | | | |
|---|---|---|---|
| 5,102,134 A | * | 4/1992 | Smyth |
| 5,130,975 A | * | 7/1992 | Akata |
| 5,367,520 A | * | 11/1994 | Cordell |
| 5,583,861 A | | 12/1996 | Holden |
| 5,737,252 A | | 4/1998 | Hollmann et al. |
| 5,862,136 A | | 1/1999 | Irwin |
| 5,871,400 A | | 2/1999 | Yfantis |
| 5,923,656 A | | 7/1999 | Duan et al. |
| 5,930,291 A | | 7/1999 | Hines |
| 6,011,779 A | | 1/2000 | Wills |
| 6,563,837 B2 | * | 5/2003 | Krishna et al. |

FOREIGN PATENT DOCUMENTS

EP        0 412 343        2/1991

OTHER PUBLICATIONS

Book, "The Art of Computer Programming", 1969, Knuth, Donald E, pp 24–27 100–103 82–85, 1965.*
PMC–Sierra, Inc. brochure, "PM3748 8 QSE 5 Gbit/s ATM Switch Fabric Element"Datasheet, Issue 3, Jun. 3, 1999 (pp. 1–135).
"A Simple and Fast Scheduler for Input Queued ATM Switches", Song et al., 1997 IEEE, pp. 260–265.
"An Efficient Statistical Multiplexing Scheme for ATM Real–Time Multimedia Services", Park et al., Feb. 2001 IEEE, pp. 127–133.
"Efficient Utilization of Multiple Channels Between Two Switches in ATM Networks", Duan et al., 1995 IEEE, pp. 1906–1911.
International Search Report, dated Nov. 16, 2001.

* cited by examiner

Primary Examiner—Ajit Patel
Assistant Examiner—Steven A Blount
(74) Attorney, Agent, or Firm—Nixon & Vanderhye P.C.

(57) ABSTRACT

A system and corresponding method for randomly reordering a plurality or sequence of elements (E). In certain embodiments, ATM cells received by a switching apparatus may be randomly reordered as they proceed through an ATM switching apparatus, so as to enable the cells to be treated in a more fair manner. In one exemplary embodiment, a number or value within a given range(s) is randomly generated for each element E in a sequence or group to be randomly reordered. Each element E is shifted through a number of empty logic units or positions determined by the randomly generated number for that element, until finally being stored in one such unit. If none of the randomly generated number(s) for an element fall within the given range, a reserve number may be used to indicate how many empty logic units the element should be shifted, or a retry flag if set may cause a new set of random numbers to be generated for the element at issue.

14 Claims, 8 Drawing Sheets

RANDOM REORDERING SYSTEM/METHOD FOR USE IN ATM SWITCHING APPARATUS

BACKGROUND

1. Field of Invention

This invention relates to a random reordering system/method. In certain embodiments, the random reordering system/method may be utilized in the context of an asynchronous transfer mode (ATM) switching apparatus in a telecommunications network.

2. Related Art and Other Considerations

The increasing interest for high band services such as multimedia applications, video on demand, video telephone, cellular telephone applications, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and have a fixed size. An ATM cell may consist e.g., of 53 octets or bytes, five of which form a header and forty-eight of which constitute a payload or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; and the virtual channel is one specific connection on the respective principal path.

At its termination points, an ATM network is connected to terminal equipment, e.g., ATM network users. Between ATM network termination points are a plurality of switching nodes having ports which are connected together by physical transmission paths or links. In traveling from an origin terminal equipment (i.e., source) to a destination terminal equipment (i.e., destination), ATM cells forming a message may travel through several switching nodes.

A switching node includes at least one switching apparatus having a plurality of ports, each of which is connected by a link circuit and a link to another node. The link circuit performs packaging of the cells according to the particular protocol in use on the link. A cell incoming to a switching apparatus may enter the switching apparatus at an ingress port and exit from an egress port via a link circuit onto a link connected to another node. Each link can carry cells for a plurality of connections.

ATM switches are known in the art. For example, see U.S. Pat. Nos. 5,983,386, 5,901,147, 5,583,861, and 5,467,347, the disclosures of which are all hereby incorporated herein by reference.

ATM switches typically have several functional parts, a primary of which is a switch core(s) or fabric(s). The switch core(s) essentially functions like a cross-connect between ports of the switch. Paths internal to the switch core or fabric are selectively controlled so that particular ports of the switch are connected together to allow a message ultimately to travel from an ingress side of the switching apparatus to an egress side thereof, and ultimately from the originating terminal equipment to the destination terminal equipment.

Two primary tasks are generally accomplished by an ATM switching apparatus: (a) translation of VPI/VCI information, and (b) transport of ATM cells from an ingress port to an egress port(s). Certain aspects of this invention relate to task (b), namely, how the cells are tagged and/or ordered as they are routed through the switch fabric and transported to egress ports of the switching apparatus. Generally, the network device which generates a given ATM cell has no knowledge of the specific output port to which the switch will send the cell. Rather, this internal switch routing decision is made by the switch based on then current translation tables within or accessed by the switch.

When an ATM cell is received by a switching apparatus, the cell is typically 53 bytes long. At the switching apparatus, a routing tag may be added to each cell so that each cell in the switch includes 54 to e.g., 59 to 64 bytes. This tag is typically added at an ingress switchboard (also known as a traffic management board or function) of the switching apparatus. The tag assigned to a cell is used by the switch core to route the cell through each switch stage in the core circuit (e.g., up to six stages may be supported in certain embodiments), and determines the switch egress port that the cell is transported to through the switch fabric or core. After a routing tag is added to a cell, the cell is stored in an appropriate ingress queue and thereafter transferred in some order (e.g., Quality of Service, or QoS, order) towards the switch core when a corresponding fabric cross-point is free. Upon reaching an appropriate egress port, by way of the switching core or fabric, the ATM cell is transmitted further along the network to another node based upon its VPI/VCI.

There exists a need in the art to randomize or quasi-randomize cells as they are forwarded through an ATM switching apparatus. Otherwise, certain cells may get preferential treatment.

SUMMARY OF THE INVENTION

A system and corresponding method for randomly reordering a plurality or sequence of elements is provided. In certain embodiments, ATM cells received by a switching apparatus (tagged or untagged) are randomly reordered as they are forwarded through the switch core. This enables cells from different ingress ports/channels to be treated in a more equal manner by the switching apparatus.

In certain embodiments, a sequence of numbers (e.g., 0 through 31) is randomly arranged. The sequence is then output to a switching device in order to control the device outputs to which particular ATM cells are forwarded. In such a manner, the ordering or transmission of ATM cells may be randomized within an ATM switching apparatus.

In one exemplary embodiment, at least one number or value within a first range(s) is randomly generated for each element E (e.g., ATM cell, switch output, number, or tag value) in a sequence or group to be randomly reordered. Each element is shifted through a number of empty logic units (e.g., buffer locations or queues) determined by one of the randomly generated numbers for that element, until the element is finally stored in one such unit.

In certain exemplary embodiments, if none of the randomly generated number(s) for an element fall within a second range, a reserve number may be used to indicate how many empty logic units the element should be shifted through before being stored. Since use of the reserve number makes the randomness less perfect, when a retry flag is set use of the reserve number may be delayed until another attempt has been made at generating a random number falling within the second range. In order to set a maximum number of iterations (akin to a time or iteration limit) for the process of randomly reordering the elements, the number of retries may be limited and the retry flag canceled as a function of time and/or the iteration being performed.

While the random reordering processes and techniques described herein are preferably used in the context of an ATM switching apparatus, the invention is not so limited. Random reordering techniques herein may be used in non-ATM environments where it is desired to randomly reorder a set or sequence of elements.

DETAILED DESCRIPTION OF THE DRAWINGS

In the following description, for purposes of explanation and not limitation, specific details are set forth such as particular architecture, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, algorithms, and methods are omitted so as not to obscure the description of the present invention with unnecessary detail.

In accordance with certain embodiments of this invention, a sequence of elements E is randomly reordered through the generation of random numbers "r." Herein, the term "random", and similar terms such as "randomly" and "randomized", include both perfectly random as well as quasi or pseudo random. It will be apparent to those skilled in the art that elements E herein are not reordered in a perfectly random sense. However, because a random number/value generator is utilized which generates random numbers/values, albeit within a given range(s), the use of the term "random" is deemed appropriate. Moreover, the term "random" is appropriate even while the use of reserve numbers may cause a reduction in the randomness of the reordering of elements.

Elements E to be randomly reordered may be, for example, a sequence of numbers, a sequence of values, ordering/sequence of requests, a sequence of tag values, or any other sequence or group of elements desired to be randomly reordered.

Figure 1A:
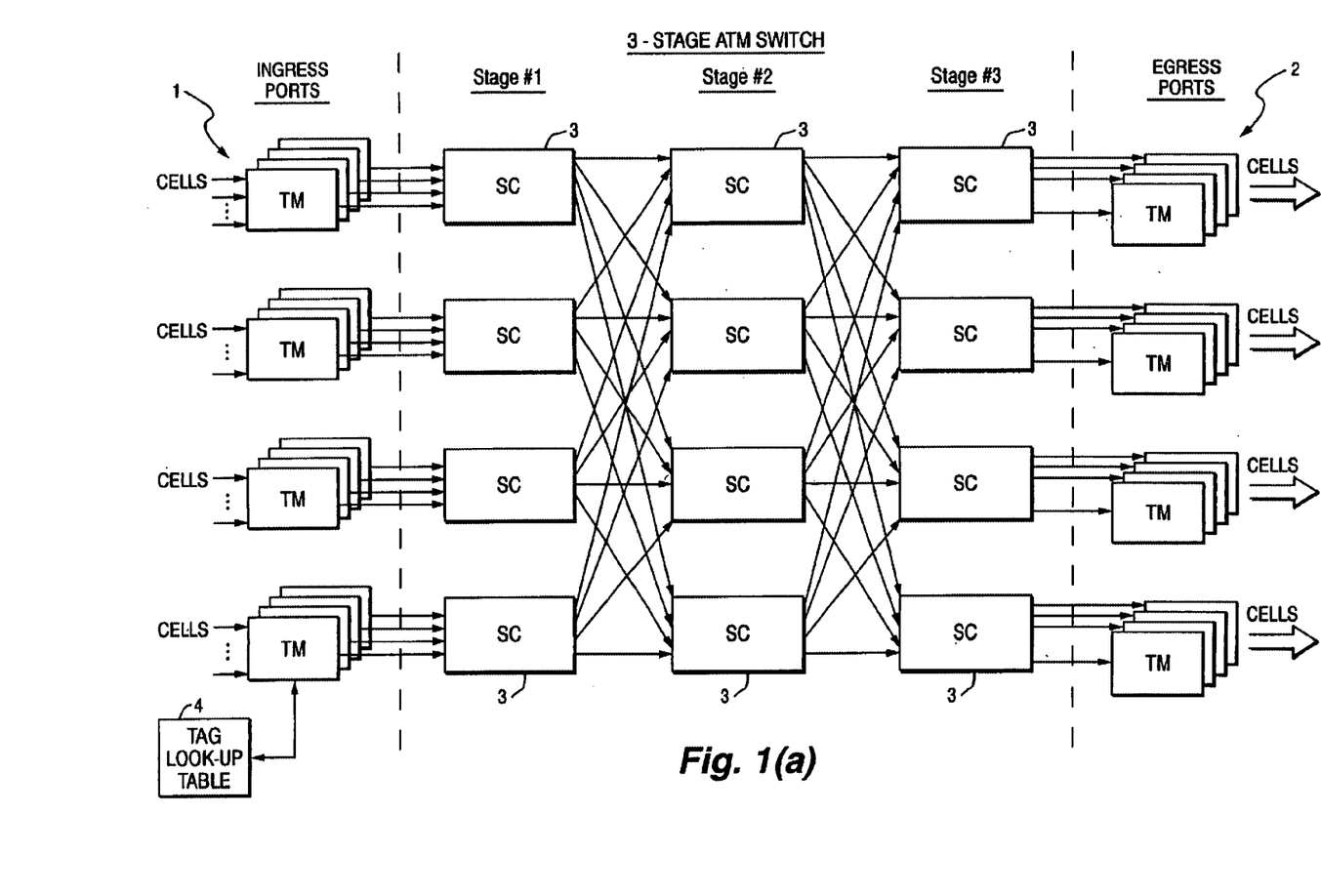
FIG. 1(a) is a simplified block diagram of a 3-stage ATM switching apparatus, including a plurality of switching devices or scores (SC) and a plurality of input/ingress and output/egress ports.
Figure 1B:
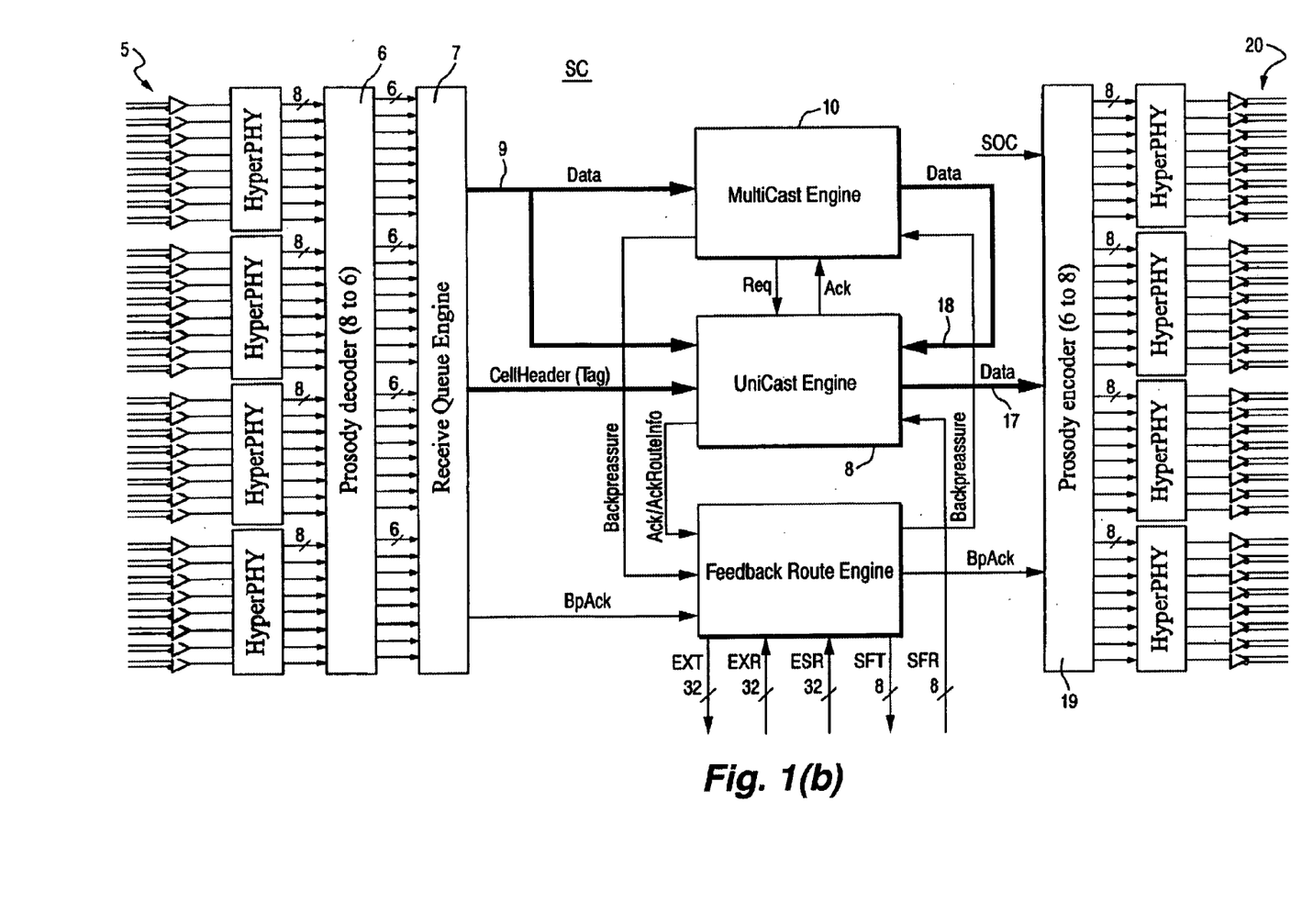
FIG. 1(b) is a simplified block diagram of an exemplary score (SC) used in the FIG. 1(a) switching apparatus, the score including a unicast engine, and an optional multicast engine.
Figure 2:
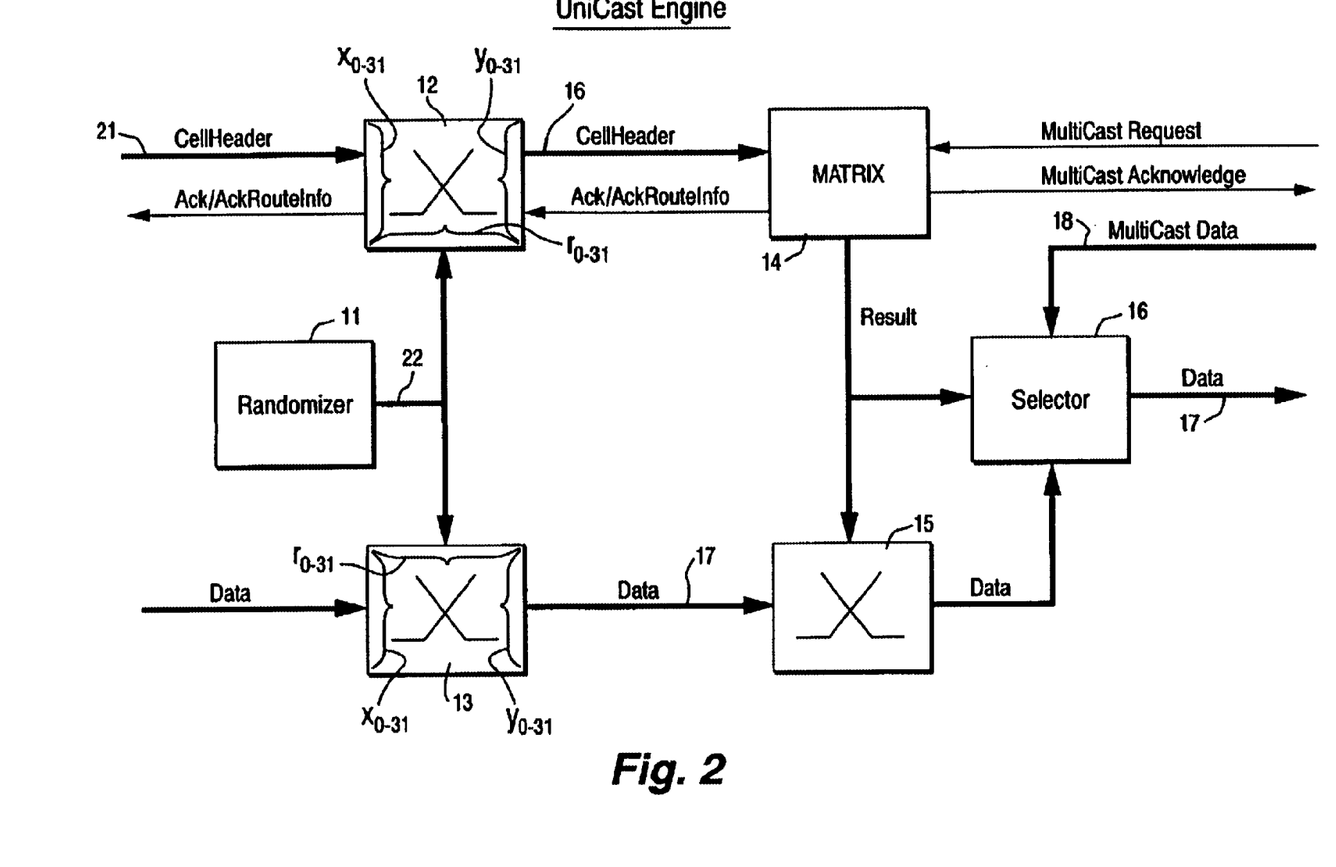
FIG. 2 is a block diagram of an exemplary unicast engine of the FIG. 1(b) score which may be used in any score herein, the unicast engine including a randomizing unit therein.

Referring to FIGS. 1(a), 1(b) and 2, the elements E to be reordered randomly according to a first embodiment of this invention are utilized in order to randomize the flow or positioning of ATM cells travelling through an TM switching apparatus in the following manner.

FIG. 1(a) illustrates an ATM switching apparatus including a plurality of ingress/input ports 1, a plurality of egress/output ports 2, and a plurality of switching devices or scores (SC) 3 therebetween. A "score" refers to the switch core ASIC in which the invention may be implemented. "SC" is short for "switch core." The switching apparatus of FIG. 1(a) is a 3 stage switching apparatus. A plurality of traffic management (i.e., TM) functions are provided at the ingress/outgress ports. As illustrated, ATM cells (including a payload and VCI/VPI) are received at ingress ports 1. A look-up table 4 is operatively associated with each ingress port TM. At least an aspect of the VCI/VPI for each incoming ATM cell is looked up in table 4, and a corresponding tag is assigned to each respective cell accordingly. Such tags, assigned at the ingress ports, are utilized in enabling cells to reach the appropriate egress port of the apparatus. The tags increase the length of each cell (e.g., to 59 bytes).

From the ingress ports 1, the ATM cells including routing tags "A" are forwarded to the first stage of switching devices SCs 3. Each SC 3 in the first stage (i.e., first column in FIG. 1(a)) receives a plurality of ATM cells (e.g., 32 cells) at approximately the same time from an ingress port(s) device. Each SC 3 then analyzes the tag of each cell and directs the cell to an SC 3 in the second stage (i.e., second column in FIG. 1(a)) as directed by the tag. Thus, each SC 3 in the first stage functions in a distributing manner. In a similar manner, each SC 3 in the second stage (i.e., second column in FIG. 1(a)) receives a plurality of ATM cells (e.g., 32 cells) at approximately the same time from SCs of the first stage. Each SC 3 in the second stage then analyzes the tag of each cell and directs the cell to an SC 3 in the third stage (i.e., third column in FIG. 1(a)) as directed by the tag. In a similar manner, each SC 3 in the third stage (i.e., third column in FIG. 1(a)) receives a plurality of ATM cells (e.g., 32 cells) at approximately the same time from SCs 3 of the second stage. Each SC 3 in the third stage then analyzes the tag of each cell and directs the cell to an egress port as directed by the tag.

A randomizing process according to an embodiment of this invention may be performed in each SC 3 in certain embodiments of this invention. In other embodiments, a randomizing process may be performed in only two stages of SCs (e.g., only in the SCs of the second and third stages, but not in the first stage). In still further embodiments, a randomizing process may be performed in only one stage (e.g., only in SCs 3 in the second stage).

FIG. 1(b) illustrates an exemplary switching device (e.g., score or SC) 3 used in the apparatus of FIG. 1(a). As illustrated, the SC includes a plurality (e g., 32) of inputs 5 for receiving incoming ATM cells including tags. After being decoded 6, receive queue engine 7, among other things, copies the tag from each cell and for each cell forwards the tag to unicast engine 8 and the data along with tag 9 to both multicast engine 10 and unicast engine 8. Multicast engine 10 is optional, and need not be provided in purely unicast embodiments.

As shown in FIG. 2, unicast engine 8 includes randomizer 11, switch 12, switch 13, matrix 14, switch 15, and selector 16. Tags are input to switch 12, while complete cells (i.e., data plus tags) are input to switch 13. As will be explained more fully below, randomizer 11 outputs sequences to switches 12 and 13 (i.e., switch output requests) that have been randomly shuffled, so that the outputs to which cells/tags are directed in switches 12 and 13 are randomly selected. As a result, the cells are more equally or fairly treated by matrix 14 and switch 15.

In general, in exemplary embodiments where the randomizer has 32 outputs and switches 12 and 13 have 32 inputs and 32 outputs, randomizer (i.e., random distribution generator) 11 distributes the number 0 through 31 in a random manner and outputs them in a random fashion to switches 12 and 13. This random distribution of numbers in the sequence of 0 through 31 which is received by switches 12 and 13 controls the switches in the following manner. Assume, for example, that switch 12 has 32 inputs $x_{0-31}$ for receiving tags 21, 32 inputs $r_{0-31}$ for receiving the random numbers 22 from randomizer, and 32 outputs $y_{0-31}$ for outputting tags 16 to matrix 14 (switch 13 is configured in a similar manner, except that it receives complete cells including data 9). Randomizer 11 transmits 32 values or numbers having values randomly arranged from 0 through 31 to inputs $r_{0-31}$ of the switch 12. For example, the random sequence 22 of values sent to the switches 12, 13 maybe 4, 7, 0, 31, 30, 2, 3, 25, 18, 16, 1, 8, 19, 22, 29, 6, 5, 28, 11, 9, 10, 27, 23, 12, 21, 13, 24, 26, 17, 14, 20, and 15, in that order applied to switch inputs $r_{0-31}$. Thus, randomizer sends value 4 to switch input $r_0$, value 7 to switch input $r_1$, value 0 to switch input $r_2$, value 31 to switch input $r_3$, and so on up until value 15 is sent to switch input $r_3$. The switch 12, 13 determines what value from the randomizer is received at each r input, and routes the tags/cells through the switch accordingly. The value received at a given switch input r determines what switch output y a cell arriving on a particular switch input x is directed. For example, when randomizer sends value 7 to switch input $r_1$, value 0 to switch input $r_2$, and value 31 to switch input $r_3$, as discussed in the aforesaid example, this causes the switch to route the tag or cell received at the switch 12, 13 at input $x_1$ to switch output $y_7$, and causes the switch to route the tag or cell received at the switch 12, 13 at input $x_2$ to switch output $y_0$, and causes the switch to route the tag or cell received at the switch 12, 13 at input $x_3$ to switch output $y_{31}$, and so forth until the switch routes, for that cell sequence, the tag or cell received at input $x_{31}$ to switch output $y_{15}$. In such a manner, the tags or cells arriving at matrix 14 and/or switch 15 have been shuffled so that they are treated more fairly. Thus, the ATM cells received at switch 13 are randomly reordered at switch 13 prior to being forwarded to switch 15. Likewise, the tags 21 received at switch 12 are randomly reordered at switch 12 prior to being forwarded to matrix 14.

In another embodiment of this invention, still referring to the sequence: 4, 7, 0, 31, 30, 2, 3, 25, 18, 16, 1, 8, 19, 22, 29, 6, 5, 28, 11, 9, 10, 27, 23, 12, 21, 13, 24, 26, 17, 14, 20, and 15, in that order applied to switch inputs $r_{0-31}$. In this another embodiment, when $r_1$ is assigned the value 7, then the input on $x_7$ is routed to output $y_1$, and so on. In other words, rN describes from what input x the output yN should be taking its information:

$$yN=x(rN).$$

In certain embodiments of this invention where multicast is not utilized, matrix 14 and switch may be eliminated. In such embodiments, the ATM cells are randomly reordered at switch 13 and output for encoding 19 and forwarding to the next SC 3 or TM (traffic management function at an egress port). In the context of the example given below in FIGS. 3–14, the elements E to be randomly reordered in the FIG. 1 embodiment are values 0–31 to be randomly reordered in randomizer 11. After the values (i.e., a set of elements E) have been reordered, they are forwarded to switch(es) 12, 13 so that the tags and/or cells at the switches can also be randomly reordered accordingly. Preferably, when distributing cells the outputs are connected to an additional switch core (SC) circuit.

After each set of ATM cells/tags received at the x inputs of a switch 12, 13 has been randomly reordered and forwarded, randomizer 11 randomly shuffles another set of values (e.g., 32 values ranging from 0 through 31) and forwards the new randomized set of values to switch(es) 12, 13 for the next cell set to be received by the switch(es).

Unicast engine 8, in general, determines which input cell should be routed to each output for unicast cells, and which outputs may be used for multicast cells. At the end of a cell cycle, engine 8 may make a request 16 for each output. Before such requests 16 for unicast cells reach route selection matrix 14, the requests are randomly shuffled due to the random output of randomizer 11 controlling switches 12 and 13. Matrix 14 instructs switch 15 as to which output each unicast cell 17 received at switch 15 should be directed. Because requests 16 have been randomized, the order in which matrix 14 address each particular cell is also randomized, and thus the cells are treated in a more fair and equal manner. After the unicast cells are output from switch 15, selector 16 as directed by matrix 14 causes unicast cells to be distributed randomly between multicast cell groups input to the selector at 18. There need not be any random distribution of cells within a multicast group. Referring back to FIG. 1(b), after the data 17 is output from unicast engine, it is encoded 19 and applied to appropriate outputs 20 of the SC 3.

While the random reordering techniques used herein are preferably applied in the context of an ATM switching apparatus as discussed above, it will be appreciated by those skilled in the art that the reordering techniques herein (e.g., see FIGS. 3 through 13) may also be applied in any other application or environment (e.g., non-ATM applications) where a sequence or set of elements/values is to be reordered or shuffled in a random manner.

Referring to FIGS. 3–14, an example of an embodiment of this invention will now be described in which a sequence/set of elements E is randomly reordered/shuffled.

Figure 3:
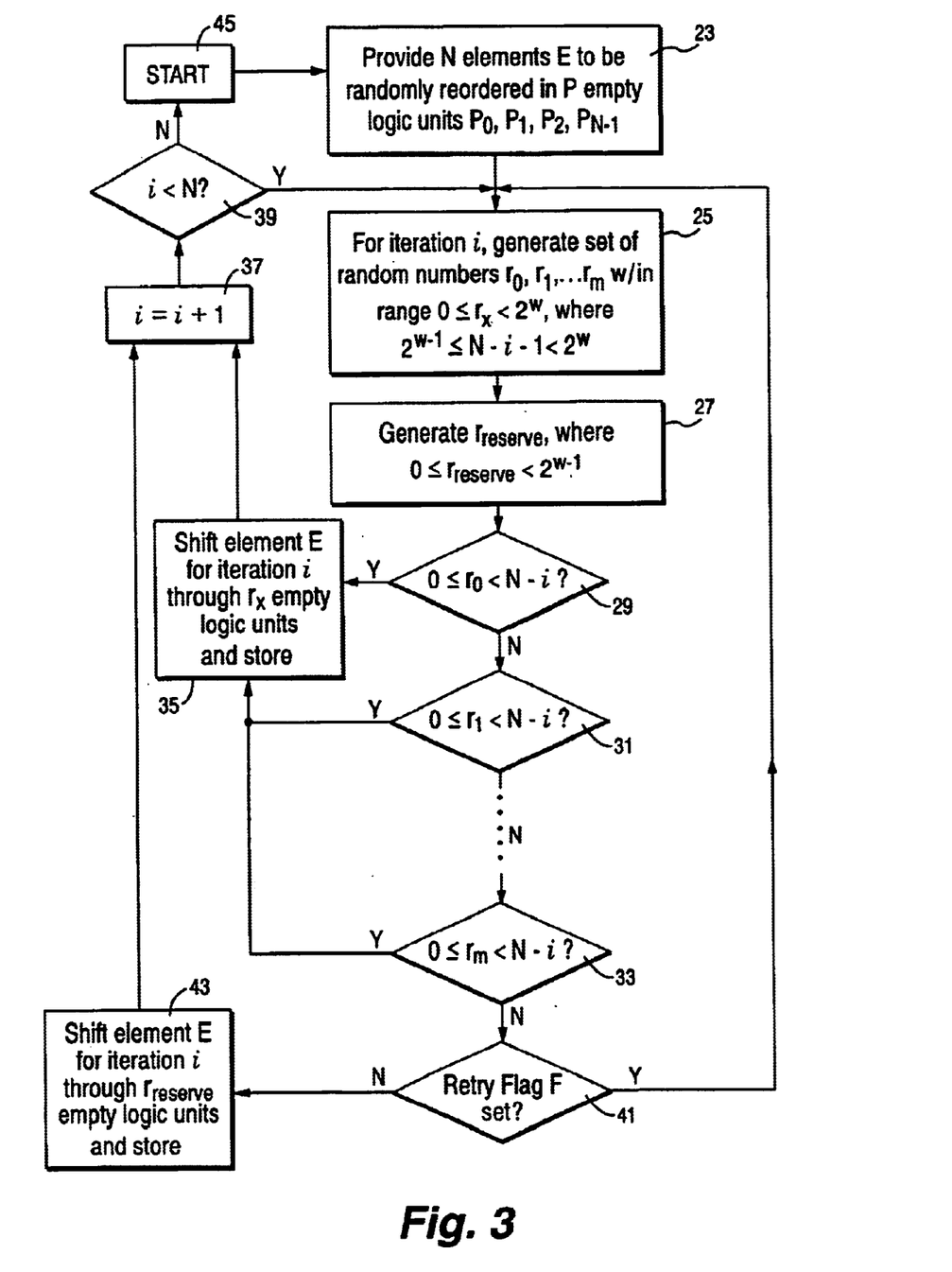
FIG. 3 is a flow chart illustrating certain steps taken in randomly reordering a set of elements E according to an embodiment of this invention.
Figure 4:
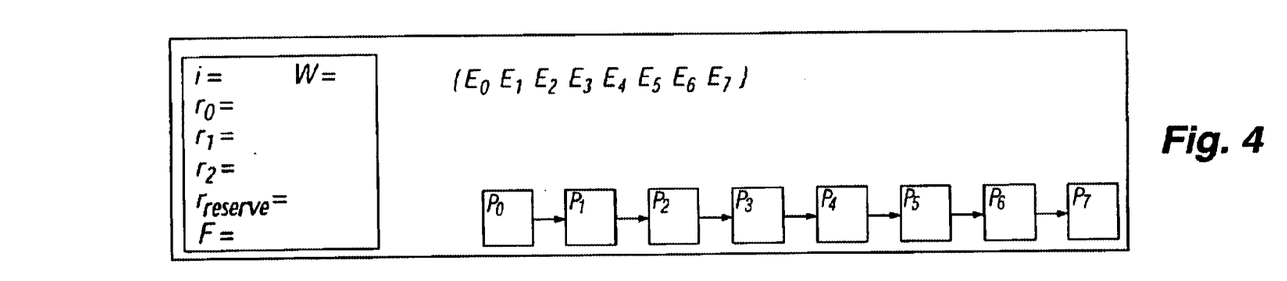
FIG. 4 illustrates a first step in random reordering of a set or sequence of elements E.

Referring to FIGS. 3 and 4, a sequence/set of elements E to be randomly reordered is provided (step 23). The elements E are to be randomly reordered in a sequence of is respective logic unit positions P, as shown in FIG. 4. In this example, eight elements $E_0$–$E_7$ are provided to be randomly reordered in eight logic unit positions $P_0$–$P_7$. Because eight (8) elements are in the sequence to be reordered, then N=8. Each logic unit position P begins in an empty state, as shown in FIG. 4. The box to the left in FIG. 4 shows a plurality of variables and random values r. In ATM embodiments, logic unit positions P may be respective storage areas in local buffers in one or more ingress switchboards (e.g., ingress queues 10), for example, or any other suitable memory location(s).

Figure 5:
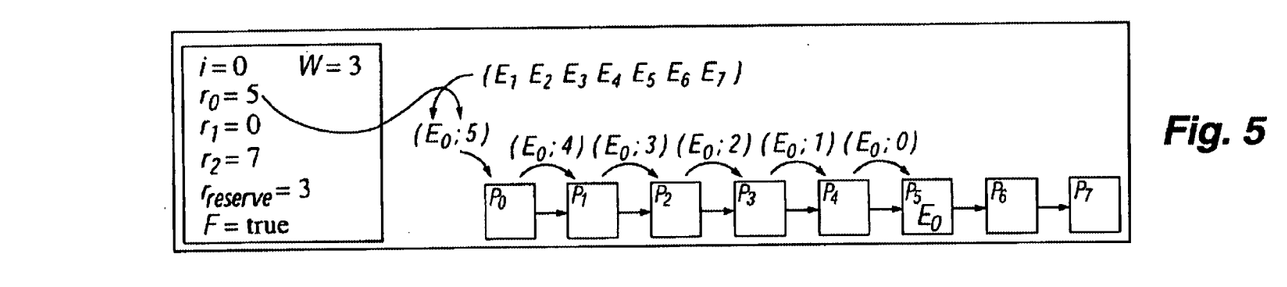
FIG. 5 illustrates a second step in random reordering of a set or sequence of elements E.

Referring now to FIGS. 3 and 5. Iteration value i is initially set to zero (0) for this first iteration. For each selection of a random number $R_i$, a set of random binary integers $\{r_0, r_1, \ldots r_M\}$ is generated, where M is typically two (2) but may be other values. For the first iteration (i=0), random numbers $r_0$, $r_1$, and $r_2$ are randomly generated by a random number generator in function 15 within the range of 0 through 7 (step 25). This range is utilized because random numbers $r_x$ must comply with:

$$0 <= r_x < 2^W \quad (1)$$

and W is selected so as to comply with:

$$2^{W-1} <= N-i-1 < 2^W \quad (2)$$

Since N=8 for the iteration (i=0), variable W must be chosen and set to a value of 3 (i.e., W=3) as can be seen from equations (1) and (2) above. Once W is set to 3, equation (1) above mandates that all randomly generated numbers r be at least zero and less than 8 (i.e., from 0 to 7). Thus, as shown in FIG. 5, W=3 and i=0 for this iteration. Moreover, the retry flag F is set (i.e., F=true), which will be described below in more detail.

In this first iteration, random numbers $r_0$, $r_1$, and $r_2$ are randomly generated by a random number generator so as to be 5, 0, and 7, respectively, as shown in FIG. 5 (step 25). A reserve random number is also generated for each iteration (step 27), so as to comply with:

$$0 <= r_{reserve} < 2^{W-1} \quad (3)$$

In the first iteration of FIG. 5, $r_{reserve}$ is generated to have a value of 3. Processing each of the randomly generated numbers $r_0$, $r_1$, and $r_2$ in order, it is then determined for each one of these numbers whether the following equation is satisfied (steps 29, 31, and 33):

$$0 <= r_x < N-i \quad (4)$$

Thus, as shown in FIG. 3, it is first determined whether equation (4) is satisfied for $r_0$ (step 29). If so, as in FIG. 5 (i.e., 5 is greater than 0 and less than 8), then the value for $r_0$ is used as the random number $R_i$, for this iteration. The first element $E_0$ in the sequence to be reordered, at issue in the first iteration, is then shifted through $R_i$, (i.e., $r_0=5$) empty positions or logic units P and stored in logic unit $P_5$ (step 35) as shown in FIG. 5. The first iteration is now complete and the value i is increased by one (i.e., i=i+1, in step 37). After the first iteration of FIG. 5, i would therefore be increased to equal 1. Since it is determined that i is less than N (i.e., 1<8), the procedure proceeds to another iteration and returns for repeating of step 25 (step 39).

Figure 6:
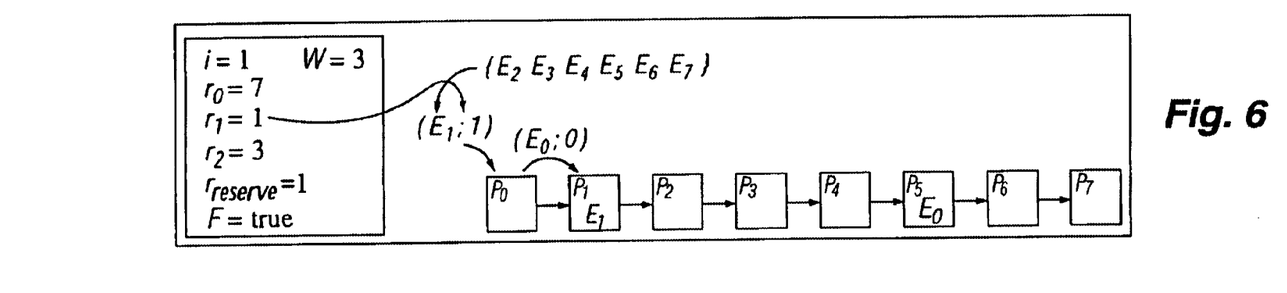
FIG. 6 illustrates a third step in random reordering of a set or sequence of elements E.

FIG. 6 illustrates the second iteration where i=1. Random numbers $r_0$, $r_1$, and $r_2$ are randomly generated by a random number generator, within the aforesaid range, so as to be 7, 1, and 3, respectively, as shown in FIG. 6 (step 25). A reserve random number is also generated (step 27) so as to comply with equation (3), i.e., $r_{reserve}=1$. In step 29, it is determined that the value 7 for $r_0$ does not satisfy equation (4), i.e., 7 is not less than (8−1=7). Thus, the process proceeds to step 31 where it is determined whether the value 1 for $r_1$, satisfies equation (4). It is determined that it does (i.e., 1 is less than 7 and at least as great as 0). Thus, step 35 is performed and the second element $E_1$, at issue in the second iteration, is shifted through $R_i$, (i.e., $r_1=1$) empty positions or logic units P and stored in logic unit $P_1$ (step 35) as shown in FIG. 6. The second iteration is now complete and the value i is now increased by one (i.e., i=i+1, in step 37). After the iteration of FIG. 6, i would therefore be increased to equal 2. Since it is determined that i is less than N (i.e., 2<8), the procedure proceeds to another iteration and returns for repeating of step 25 (step 39).

Figure 7:
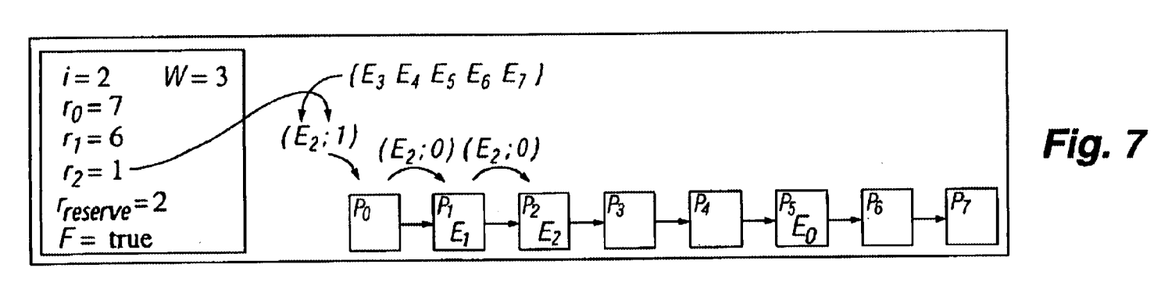
FIG. 7 illustrates a fourth step in random reordering of a set or sequence of elements E.

FIG. 7 illustrates the third iteration where i=2. Random numbers $r_0$, $r_1$, and $r_2$ are randomly generated by a random number generator, within the aforesaid range, so as to be 7, 6, and 1, respectively, as shown in FIG. 7 (step 25). A reserve random number is also generated (step 27) so as to comply with equation (3), i.e., $r_{reserve}=2$. In step 29, it is determined that the value 7 for $r_0$ does not satisfy equation (4), i.e., 7 is not less than (8−2=6). Thus, the process proceeds to step 31 where it is determined whether the value 6 for $r_1$ satisfies equation (4). In step 31, it is determined that the value 6 for $r_1$ does not satisfy equation (4), i.e., 6 is not less than (8−2=6). Thus, the process proceeds to step 33 where it is determined whether the value 1 for $r_2$ satisfies equation (4). It is determined that it does (i.e., 1 is less than 6 and at least as great as 0). Thus, step 35 is performed and the third element $E_2$, at issue in the third iteration, in the sequence is then shifted through $R_i$, (i.e., $r_2=1$) empty positions or logic units P and stored in logic unit $P_2$ (step 35) as shown in FIG. 7. After being shifted through empty location $P_0$, the next location $P_1$ is skipped because it is occupied. Thus, element $E_2$ is stored in the first empty location available in sequence after it has been shifted through one empty position. The third iteration is now complete and the value i is increased by one (i.e., i=i+1, in step 37). After the iteration of FIG. 7, i would therefore be increased to equal 3. Since it is determined that i is less than N (i.e., 3<8), the procedure proceeds to another iteration and returns for repeating of step 25 (step 39).

Figure 8:
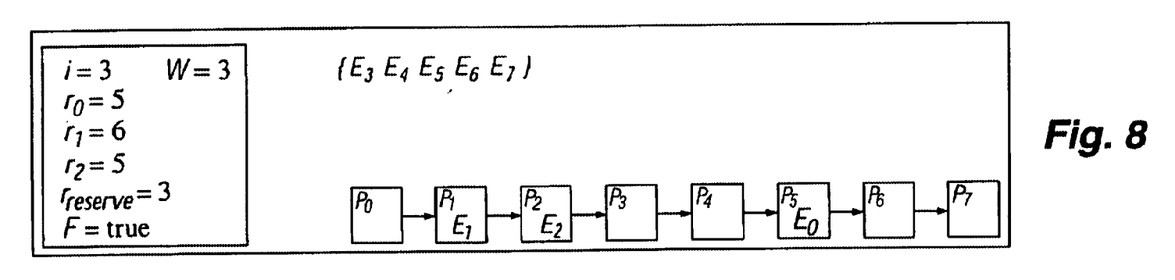
FIG. 8 illustrates a fifth step in random reordering of a set or sequence of elements E.

FIG. 8 illustrates the fourth iteration where i=3. Random numbers $r_0$, $r_1$, and $r_2$ are randomly generated by a random number generator, within the aforesaid range, so as to be 5, 6, and 5, respectively, as shown in FIG. 8 (step 25). A reserve random number is also generated (step 27) so as to comply with equation (3), i.e., $r_{reserve}=3$. In step 29, it is determined that the value 5 for $r_0$ does not satisfy equation (4), i.e., 5 is not less than (8−3=5). Thus, the process proceeds to step 31 where it is determined whether the value 6 for $r_1$ satisfies equation (4). In step 31, it is determined that the value 6 for r, does not satisfy equation (4), i.e., 6 is not less than (8−3=5). Thus, the process proceeds to step 33 where it is determined whether the value 5 for $r_2$ satisfies equation (4). In step 33, it is determined that the value 5 for $r_2$ does not satisfy equation (4), i.e., 5 is not less than (8−3=5). Thus, the process proceeds to step 41 where it is determined whether the retry flag F is set (i.e., whether F is set to "true"). It is determined in step 41 that the retry flag F is set, so the process does not store $E_3$ in any location or logic unit P and proceeds back to step 25 so as to generate another set of random numbers. The value $r_{reserve}$ is not used to store the element at issue because the retry flag was set. The fourth iteration is not yet complete, and i is not increased.

In this particular example, the retry flag is programmed to be adjusted to "false" (i.e., cancelled or turned off) after causing one retry of an iteration. This avoids excessive delays be having numerous retries performed, thereby guaranteeing that the elements will be randomly reordered within a predetermined period of time or number of iteration tries.

Figure 14:
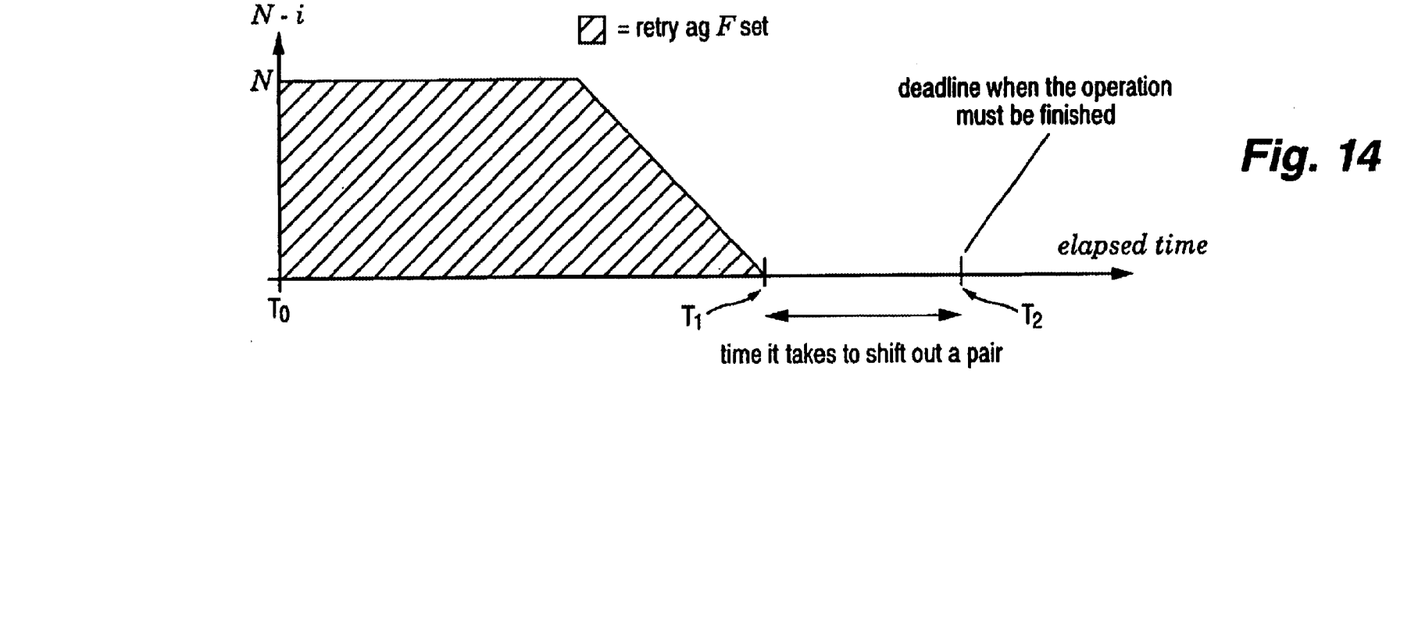
FIG. 14 is a time versus N-i graph illustrating that the retry flag F may be set or canceled as a function of these two parameters.

This is important in certain embodiments, e.g., ATM switching applications. However, it is noted that the retry flag F may be programmed or otherwise caused to be set to "false" after any predetermined threshold number of retries are performed in the course of reordering a given sequence (e.g., after, 2, 3, 4, or more retries), depending upon the amount of time desired within which to complete the reordering of elements E. In still further embodiments, the retry flag F may be caused to automatically be set to "false" upon expiration of a predetermined period of time after reordering of a given sequence of elements has begun. For example, if it is desired to complete the reordering within ten units of time, the retry flag F may be caused to automatically switch from "true" (i.e., set) to "false" (i.e., not set) after expiration of, e.g., 7 units of time. In still further embodiments exemplified by FIG. 14, whether the retry flag F is set may be determined as a function of N−i versus time. In other words, FIG. 14 shows that the retry flag may be caused to automatically be switched to "false" as the iteration numbers increase (i.e., as i increases and N−i decreases) and time following the start $T_0$ of a reordering process increases. At time $T_1$, the retry flag is automatically switched to "false" regardless of what iteration is being performed. Again, the purpose of such an automatic canceling of the retry flag is to ensure that the reordering is completed within a predetermined period of time $T_2$.

Figure 9:
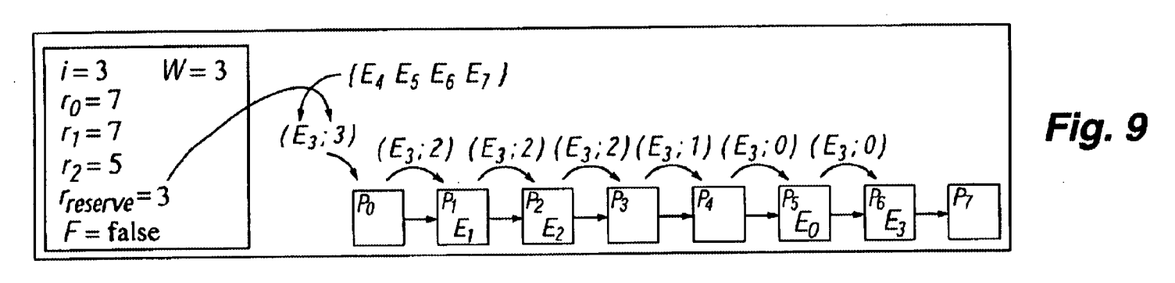
FIG. 9 illustrates a sixth step in random reordering of a set or sequence of elements E.

Referring now to FIG. 9, in retrying the fourth iteration, i=3. Another set of random numbers $r_0$, $r_1$, and $r_2$ is generated for this iteration within the aforesaid range, so as to be 7, 7, and 5, respectively, as shown in FIG. 9 (step 25). A reserve random number is also generated (step 27) so as to comply with equation (3), i.e., $r_{reserve}$=3. In step 29, it is determined that the value 7 for $r_0$ does not satisfy equation (4), i.e., 7 is not less than (8−3=5). Thus, the process proceeds to step 31 where it is determined whether the value 7 for $r_1$ satisfies equation (4). In step 31, it is determined that the value 7 for $r_1$ does not satisfy equation (4), i.e., 7 is not less than (8−3=5). Thus, the process proceeds to step 33 where it is determined whether the value 5 for $r_2$ satisfies equation (4). It is determined that it does not, i.e., 5 is not less than (8−3=5). Thus, the process proceeds to step 41 where it is determined whether the retry flag F is set (i.e., whether F is set to "true"). It is determined in step 41 the retry flag F is not set, i.e., F=false. Thus, step 43 is performed and the fourth element $E_3$, at issue in the fourth iteration, in the sequence is then shifted through $R_i$, (i.e., $r_{reserve}$=3) empty positions or logic units P and stored in logic unit $P_6$ as shown in FIG. 9. As can be seen in FIG. 9, filled positions do not count in the shifting process and are skipped over. After being shifted through empty positions $P_0$, $P_3$, and $P_4$ (as well as over filled positions $P_1$, $P_2$, and $P_5$), the element is stored in $P_6$. The fourth iteration is now complete and the value i is increased by one (i.e., i=i+1, in step 37). After the iteration of FIG. 9, i would therefore be increased to equal 4. Since it is determined that i is less than N (i.e., 4<8), the procedure proceeds to another iteration and returns for repeating of step 25 (step 39).

Figure 10:
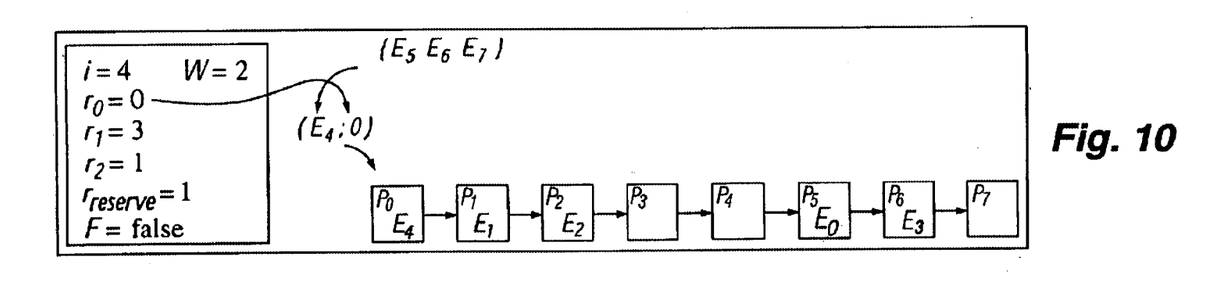
FIG. 10 illustrates a seventh step in random reordering of a set or sequence of elements E.

FIG. 10 illustrates the fifth iteration where i=4. Because i has been increased to 4, W must be decreased to 2 so as to conform with equation (2) above. In accordance with equation (1) above, the new range within which the random numbers r are generated is now from 0–3 due to the change in W. In this iteration, random numbers $r_0$, $r_1$, and $r_2$ are randomly generated by a random number generator, within the aforesaid new range, so as to be 0, 3, and 1, respectively, as shown in FIG. 10 (step 25). A reserve random number is also generated (step 27) so as to comply with equation (3), i.e., $r_{reserve}$=1. Again, the retry flag is set to false because in this particular example it is programmed to be canceled after one retry which was performed above regarding FIGS. 8–9. In step 29, it is determined that the value 0 for $r_0$ satisfies equation (4), i.e., 0 is less than (8−4=4). Thus, step 35 is performed and the fifth element $E_4$, at issue in the fifth iteration, in the sequence is then shifted through $R_i$, (i.e., $r_0$=0) empty positions or logic units P and is thus stored in the first available logic unit or position, i.e. $P_0$ (step 35) as shown in FIG. 10. The fifth iteration is now complete and the value i is now increased by one (i.e., i=i+1, in step 37). After the iteration of FIG. 10, i would therefore be increased to equal 5. Since it is determined that i is less than N (i.e., 5<8), the procedure proceeds to another iteration and returns for repeating of step 25 (step 39).

Figure 11:
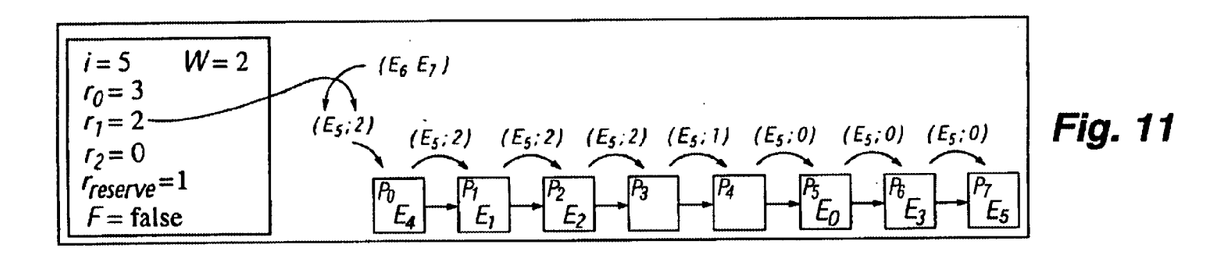
FIG. 11 illustrates an eighth step in random reordering of a set or sequence of elements E.

FIG. 11 illustrates the sixth iteration where i=5. Random numbers $r_0$, $r_1$, and $r_2$ are randomly generated by a random number generator, within the aforesaid new range 0–3, so as to be 3, 2, and 0, respectively, as shown in FIG. 11 (step 25). A reserve random number is also generated (step 27) so as to comply with equation (3), i.e., $r_{reserve}$=1. In step 29, it is determined that the value 3 for $r_0$ does not satisfy equation (4), i.e., 3 is not less than (8−5=3). Thus, the process proceeds to step 31 where it is determined whether the value 2 for $r_1$ satisfies equation (4). It is determined that it does (i.e., 2 is less than 3 and at least as great as 0). Thus, step 35 is performed and the sixth element $E_5$ (i.e., the pair of $E_5$:$R_i$) at issue in the sixth iteration, in the sequence is then shifted through $R_i$, (i.e., $r_1$=2) empty positions or logic units P and stored in logic unit $P_7$ (step 35) as shown in FIG. 11. The sixth iteration is now complete and the value i is now increased by one (i.e., i=i+1, in step 37). After the iteration of FIG. 11, i would therefore be increased to equal 6. Since it is determined that i is less than N (i.e., 6<8), the procedure proceeds to another iteration and returns for repeating of step 25 (step 39).

Figure 12:
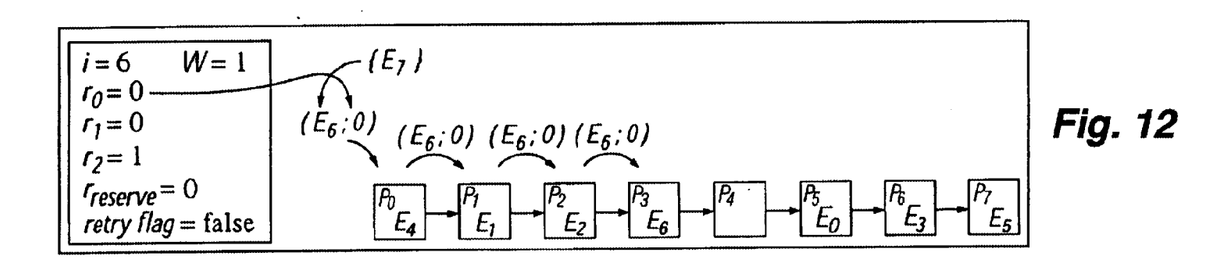
FIG. 12 illustrates a ninth step in random reordering of a set or sequence of elements E.

FIG. 12 illustrates the seventh iteration where i=6. Because i has been increased to 6, W must be decreased to 1 so as to conform with equation (2) above. In accordance with equation (1) above, the new range within which the random numbers r are generated is now from 0–1 due to the change in W. In this iteration, random numbers $r_0$, $r_1$, and $r_2$ are randomly generated by a random number generator, within the aforesaid new range, so as to be 0, 0, and 1, respectively, as shown in FIG. 12 (step 25). A reserve random number is also generated step 27) so as to comply with equation (3), i.e., $r_{reserve}$=0. In step 29, it is determined that the value 0 for $r_0$ satisfies equation (4), i.e., 0 is less than (8−6=2). Thus, step 35 is performed and the seventh element $E_6$, at issue in the seventh iteration, is shifted through $R_i$, (i.e., $r_0$=0) empty positions or logic units P and is thus stored in the first available logic unit or position, i.e. $P_3$ (step 35) as shown in FIG. 12. The seventh iteration is now completed and the value i is now increased by one (i.e., i=i+1, in step 37). After the iteration of FIG. 12, i would therefore be increased to equal 7. Since it is determined that i is less than N (i.e., 7<8), the procedure proceeds to another iteration and returns for repeating of step 25 (step 39).

Figure 13:
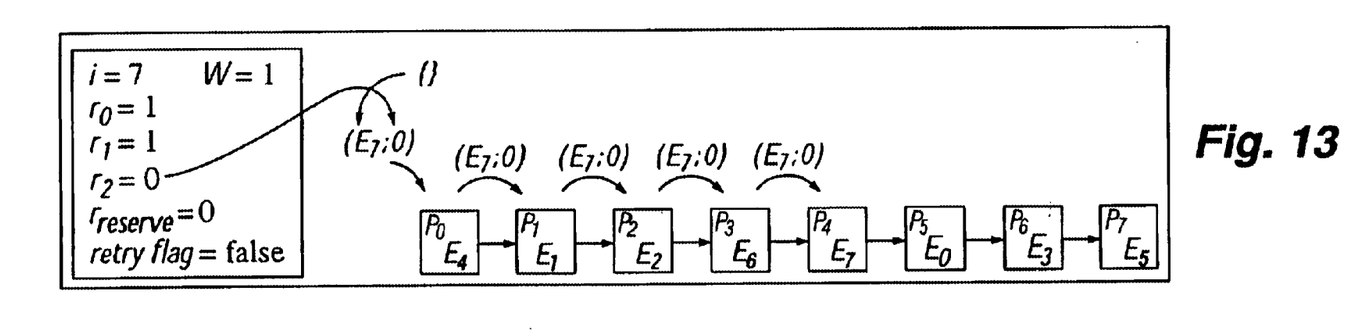
FIG. 13 illustrates a tenth step in random reordering of a set or sequence of elements E.

FIG. 13 illustrates the eighth iteration where i=7. In this iteration, random numbers $r_0$, $r_1$, and $r_2$ are randomly generated by a random number generator, within the aforesaid new range, so as to be 1, 1, and 0, respectively, as shown in FIG. 13 (step 25). A reserve random number is also generated (step 27) so as to comply with equation (3), i.e., $r_{reserve}$=0. In step 29, it is determined that the value 1 for $r_0$ does not satisfy equation (4), i.e., 1 is not less than (8−7=1).

Thus, the process proceeds to step 31 where it is determined whether the value 1 for $r_1$ satisfies equation (4). In step 31, it is determined that the value 1 for $r_1$ does not satisfy equation (4), i.e., 1 is not less than (8−7=1). Thus, the process proceeds to step 33 where it is determined whether the value 0 for $r_2$ satisfies equation (4). It is determined that it does (i.e., 0 is less than 1 and at least as great as 0). Thus, step 35 is performed and the eighth element $E_7$, at issue in the eighth iteration, is shifted through $R_i$, (i.e., $r_2$=0) empty positions or logic units P and stored in the first available empty logic unit $P_4$ (step 35) as shown in FIG. 13. The eighth iteration is now complete and the value i is now increased by one (i.e., i=i+1, in step 37). After the iteration of FIG. 13, i would therefore be increased to equal 8. Since it is determined that i is not less than N (i.e., 8 is not less than 8), the procedure proceeds back to start 45 recognizing that the sequence of elements E has been randomly reordered. The function now waits for another set or sequence of elements which require random reordering.

Positions P of the randomly reordered set, shown in FIG. 13, may be different positions in a buffer memory, or different positions for numbers in a sequence to be stored in an ATM switching apparatus, or any other suitable device or memory.

The example described above and shown in FIGS. 5–13 is specific to a scenario where eight elements E (e.g., numbers in sequence of switch instructions, ATM cells, etc.) are provided in a set/sequence to be reordered. However, any number of elements E may be provided in a set/sequence to be reordered in other embodiments of this invention. For example, if a 64 by 64 switching device 12, 13 in an ATM switching apparatus is to be controlled, sixty-four different elements E may be randomly reordered as discussed above. In the embodiment of FIGS. 1–2 where switches 12, 13 were described as 32×32×32, then thirty-two (32) elements E are to be randomly reordered in randomizer 11. Any other suitable number of elements E may also be randomly reordered as described herein.

While certain embodiments of this invention are preferably implemented with regard to unicast cells in an ATM switch, certain alternative embodiments may be applied to cells that are to be transmitted to more than one location (i.e., multicast or quasi-multicast).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of randomly reordering received ATM cells in an ATM switching apparatus, comprising:

receiving a plurality of ATM cells at a first set of inputs of a switching device in the ATM switching apparatus;

receiving a randomized set of values at a second set of inputs of the switching device;

randomly reordering the received ATM cells at the switching device based at least in part upon the randomized set of values received at the second set of inputs so as to form a randomly reordered set of ATM cells;

causing the randomly reordered set of ATM cells to be forwarded to another component of the ATM switching apparatus;

in a randomizer or random generator, randomizing a set of elements E in which for a first one of the elements E at least the following steps are performed:

randomly generating first, second, and third random numbers within a first range;

determining whether the first random number falls within a second range;

when the first random number falls within the second range, shifting the first element E through a number of empty position locations based upon the first random number before storing the element E in a position location;

when the first random number does not fall within the second range, determining whether the second random number falls within the second range;

when the second random number falls within the second range, shifting the first element E through a number of empty position locations based upon the second random number before storing the element E in a position location;

when the second random number does not fail within the second range, determining whether the third random number falls within the second range; and when the third random number falls within the second range, shifting the first element E through a number of empty position locations based upon the third random number before storing the element E in a position location.

2. The method of claim 1, further comprising the steps of:

when the third random number does not fall within the second range, determining whether a retry flag is set;

when the retry flag is set, generating another set of first, second and third random numbers within the first range without storing the first element E in a position location of a reordered set;

when it is determined that one of the numbers in the another set of first, second and third random numbers is within the second range, shifting the first element E through a number of empty position locations based upon the random number within the second range before storing the first element E in a position location; and forwarding the randomized set of element E to the switching device.

3. The method of claim 1, further comprising the step of determining whether to set a retry flag indicative of whether to generate a new set of random numbers for a particular element E in a set of elements E to be reordered, based at least in part upon time elapsed since initiation of randomly reordering the set of elements.

4. The method of claim 1, further comprising locating each of a plurality of elements E to be reordered based upon only one of a plurality of randomly generated numbers within a range that are generated for each such element.

5. The method of claim 4, further comprising selecting the one of a plurality of randomly generated numbers for each element based upon whether the one randomly generated number is less than a predetermined value.

6. A method of randomly reordering a set of elements E in an ATM switching apparatus, the method comprising:

randomly reordering the set of elements E to provide a reordered set of elements E;

causing the reordered set of elements E to be utilized in randomly reordering a set of ATM tags or cells in a switching device in the ATM switching apparatus;

wherein said randomly reordering comprises, for a first element of the set to be reordered:

randomly generating first, second, and third random numbers within a first range;

determining whether the first random number falls within a second range;

when the first random number falls within the second range, shifting the first element through a number of empty position locations based upon the first random number before storing the first element in a position location;

when the first random number does not fall within the second range, determining whether the second random number falls within the second range;

when the second random number falls within the second range, shifting the first element through a number of empty position locations based upon the second random number before storing the first element in a position location;

when the second random number does not fall within the second range, determining whether the third random number falls within the second range; and when the third random number falls within the second range, shifting the first element through a number of empty position locations based upon the third random number before storing the first element in a position location.

7. The method of claim 6, further comprising the steps of:

when the third random number does not fall within the second range, determining whether a retry flag is set;

when the retry flag is set, generating another set of first, second and third random numbers within the first range without storing the first element in a position location of reordered set;

when it is determined that one of the random numbers in the another set of first, second and third random numbers is within the second range, shifting the first element through a number of empty position locations based upon the random number within the second range before storing the first element in a position location; and wherein the elements are values to be reordered and thereafter sent to a switching device in the ATM switching apparatus so that ATM cells or tags may be randomly reordered at the switching device.

8. The method of claim 6, further comprising the step of determining whether to set a retry flag indicative of whether to generate a new set of random numbers for a particular element E in the set to be reordered, based at least in part upon time elapsed since initiation of said randomly reordering step.

9. The method of claim 6, wherein said randomly reordering step comprises locating each of a plurality of elements in the set to be reordered based upon one of a plurality of randomly generated numbers within a range that are generated for each such element.

10. The method of claim 9, further comprising selecting the one of a plurality of randomly generated numbers for each element based upon whether the one randomly generated number is less than a predetermined value.

11. The method of claim 9, further comprising the step of using a reserve randomly generated number when it is determined that none of the plurality of randomly generated numbers fall within the range, and when it is further determined that a retry flag is not set.

12. A method of reordering a set or sequence of ATM cells in an ATM switching apparatus, the method comprising:

the ATM switching apparatus receiving a number of ATM cells in the set or sequence to be reordered;

for at least one ATM cell in the set or sequence, performing at least the following:
  a) generating a plurality of random numbers within a first range;
  b) when at least one of the plurality of random numbers falls within a second range, shifting the ATM cell through a plurality of empty positions based upon the one number before storing the ATM cell in a position of a reordered set or sequence;
  c) when none of the plurality of random numbers fall within the second range, determining whether a retry flag is set;
  d) when the retry flag is set, repeating said steps a) and b) for the same ATM cell without storing that ATM cell in a position of a reordered set; and
  e) when the retry flag is not set, shifting the ATM cell through a plurality of empty positions based upon a randomly generated reserve number that is randomly generated within a third range that is different from the first and second ranges, before storing the ATM cell in a position of a reordered set or sequence.

13. A method of reordering a set or sequence of ATM cells in an ATM switching apparatus, the method comprising:

providing a number of ATM cells in the ATM switching apparatus in the set or sequence to be reordered;

for at least one ATM cell in the set or sequence, performing at least the following:
  a) generating a plurality of random numbers within a first range;
  b) when at least one of the plurality of random numbers falls within a second range, shifting the ATM cell through a plurality of empty positions based upon the one number before storing the ATM cell in a position of a reordered set or sequence;
  c) when none of the plurality of random numbers fall within the second range, determining whether a retry flag is set;
  d) when the retry flag is set, repeating said steps a) and b) for the same ATM cell without storing that ATM cell in a position of a reordered set; and determining whether to set the retry flag based at least in part upon time elapsed since initiation of said randomly reordering step.

14. An ATM switching apparatus for reordering a set or sequence of ATM cells in the ATM switching apparatus, the ATM switching apparatus comprising:

receiving means for receiving a number of ATM cells in a set or sequence to be reordered;

a reordering unit for a) generating a plurality of random numbers within a first range for at least one of the ATM cells in the set or sequence to be reordered, b) when at least one of the plurality of random numbers falls within a second range, shifting the one ATM cell through a plurality of empty positions based upon the one number and storing the ATM cell in a position of a reordered set or sequence, and c) repeating a) and b) for additional ATM cells in the set or sequence to be reordered.

* * * * *